C. & H. BRUNS.
OBJECTIVE SHUTTER.
APPLICATION FILED NOV. 9, 1911.

1,053,152.

Patented Feb. 18, 1913.
2 SHEETS—SHEET 2.

Witnesses:
Eugen Berchtold
Felix Seidel

Inventors:
Christian Bruns
Heinrich Bruns

UNITED STATES PATENT OFFICE.

CHRISTIAN BRUNS AND HEINRICH BRUNS, OF MUNICH, GERMANY, ASSIGNORS TO CHRISTIAN BRUNS & CIE., G. M. B. H., OF MUNICH, GERMANY.

OBJECTIVE-SHUTTER.

1,053,152.   Specification of Letters Patent.   Patented Feb. 18, 1913.

Application filed November 9, 1911. Serial No. 659,420.

*To all whom it may concern:*

Be it known that we, CHRISTIAN BRUNS and HEINRICH BRUNS, citizens of the German Empire, residing at Munich, Germany, have invented a new and useful Objective-Shutter, of which the following is a specification.

The invention relates to objective shutters fitted for regulating the duration of exposure with a retarding means, which is connected with the actuating mechanism of the shutter and, according as it is set, more or less retards the running down of the shutter without interrupting this motion. According to the present invention an auxiliary device of this description is to be disposed in such a manner that it can be brought into an operative position by being connected either with the actuating mechanism of the shutter or the main retarding means. A shutter so fitted can then also be used for exposures, which are of longer duration than the longest obtainable with the main retarding means alone.

Non-interruptive retarding appliances are known in various constructional forms; for objective shutters there are principally employed trains of wheels or escapements. The effect of the main retarding means on the running down of the shutter can be regulated by coupling a member of the actuating mechanism of the shutter on a variable section of the path, which this member travels, with the main retarding means.

In order to simplify the manipulation, it is well to combine with the device, by the actuation of which the shutter is set for the duration of exposure desired in each case, a second device in such a manner that the latter, when the exposure setting device is being set for a duration not to be attained with the main retarding means alone, brings the auxiliary retarding device into operative relation to the actuating mechanism without special manipulation. A spring may e. g. be so disposed as to tend to couple the auxiliary retarding device with the main retarding means, thus bringing about indirectly the said relation, and a lever may be connected to the exposure setting device, which lever interferes with the function of the spring, for as long as the duration of exposure set for is attainable by the main retarding means alone.

Figure 1:
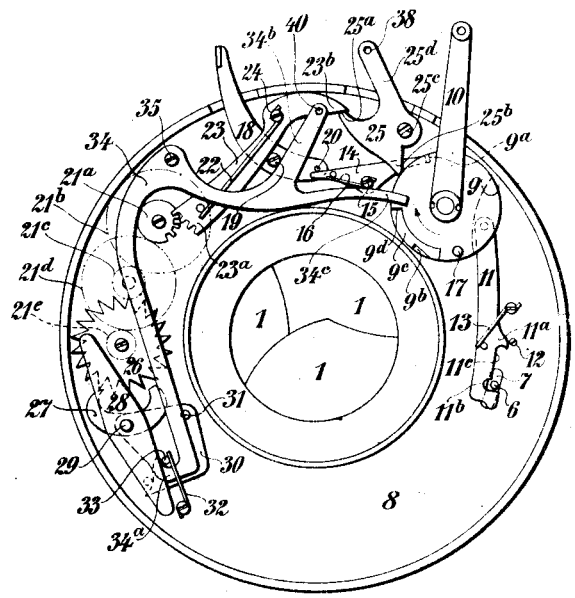
Figure 2:
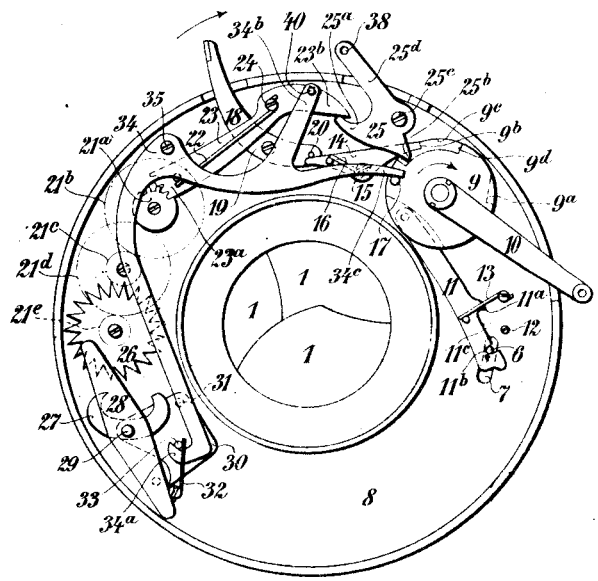
Figure 3:
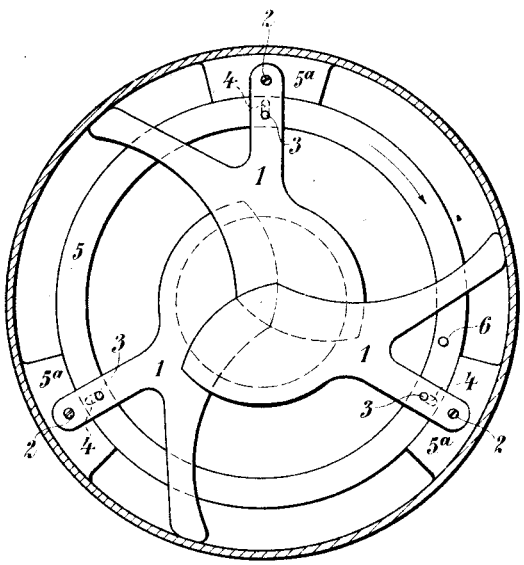
Figure 4:
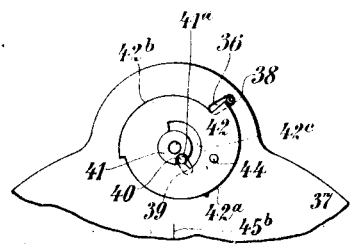
Figure 5:
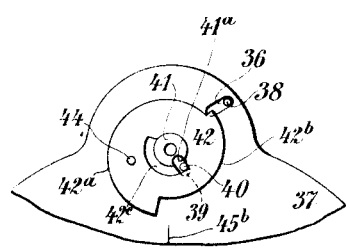
Figure 6:
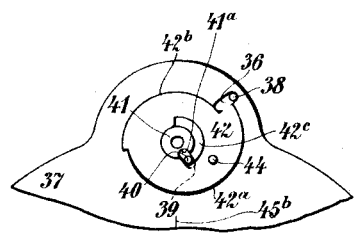
Figure 7:
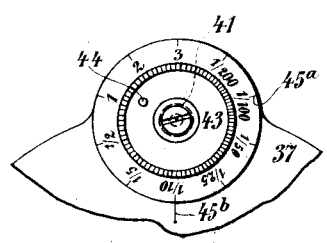

In the annexed drawing: Figure 1 is a front elevation of an objective shutter constructed according to the invention, the annular cover-plate being removed and the shutter being shown unwound. Fig. 2 is a similar view, the shutter being wound up. Fig. 3 is a section at right angles to the axis through the casing of the above shutter showing the shutter-blades. Fig. 4 is a part front view of the cover-plate showing the device for regulating the duration of exposure set for the shortest exposure possible. Fig. 5 is a similar view, the device being set for the shortest exposure attainable with the auxiliary retarding device. Fig. 6 is a similar view, the device being set for the longest exposure attainable with the auxiliary retarding device. Fig. 7 is an external view corresponding to Figs. 4 to 6.

Three blades 1 (Fig. 3), which form the shutter proper, respectively have fixed pivots 2 and are provided with pins 3 which enter slots 4 of a ring 5, which is journaled in three guiding pieces 5ª concentrically with the axis of the shutter. A movement of this ring in the direction of the arrow marked in Fig. 3 opens the shutter, the reversed movement closes it again. An actuating pin 6 is fixed to the ring 5 and projects through a slot 7 (Figs. 1 and 2) of a plate 8, which bears the actuating mechanism, the main retarding means and the auxiliary retarding device.

For actuating the shutter by acting on the pin 6 a spring-drum 9 is made use of, the spring of which (not shown) is wound up by rotating the drum in the direction of the arrow (shown in Fig. 1) by means of a lever 10. A link 11 effects the opening and closing of the shutter. This link, when the shutter is not wound up, is in contact by means of a projection 11ª with a stop 12 and is thereby hindered from embracing under the influence of a spring 13 the actuating pin 6 by means of a notch 11ᵇ. When the shutter is being wound up the link 11 first of all passes to and through the position, in which it stands radially to the spring-drum, moving with a surface 11ᶜ backward and forward against the actuating pin 6. Immediately previous to the link reaching the position shown in Fig. 2, it slides with its surface 11ᶜ from off the pin 6, so as under the influence of the spring 13 to embrace this pin by means of its notch 11ᵇ

11ᵇ. A pivoted catch 14, which is fulcrumed to a fixed pivot 15, engages, when the shutter is unwound, with a notch 9ᵃ of the spring-drum 9, and is forced, when the winding up is completed, by a spring 16 into another notch 9ᵇ of this drum, whereby the latter is prevented from flying back. The importance of a recess 9ᶜ and of one of its edges 9ᵈ, as also that of a pin 17 fixed to the spring-drum is described below.

A double lever 18, which is fulcrumed to a fixed pivot 19, serves for releasing the shutter. One arm of this lever projects through to the outside, while the other rests with a pin 20 thereof against the pivoted catch 14. On the shutter being released by turning the lever 18 in the direction of the arrow shown in Fig. 2, the spring-drum returns to its position as shown in Fig. 1. During this action the link 11 first of all shifts, through acting on the pin 6, the ring 5 in the direction of the arrow shown in Fig. 3 and so opens the shutter, then passes through the position, in which it stands radially to the spring-drum, reverses during this action its direction of motion and closes the shutter again. Shortly before the link reaches its position as shown in Fig. 1, it strikes with its projection 11ᵃ the stop 12 and is by this means pushed off, so that it ceases to embrace with its notch 11ᵇ the pin 6.

The main retarding means consists of five toothed wheels 21ᵃ, 21ᵇ, 21ᶜ, 21ᵈ, 21ᵉ. A spring 22 seeks to bring a double lever 23, which is fulcrumed to a fixed pivot 24, into the position as shown in Fig. 2. The double lever engages by means of one of its arms 23ᵃ, which is formed as a toothed sector, with the toothed wheel 21ᵃ and presses with its other arm 23ᵇ against an arm 25ᵃ of a lever 25 with several arms. This lever is fitted with a tooth-shaped arm 25ᵇ, for the purpose of being able to engage with the recess 9ᶜ of the spring-drum, and is fulcrumed to a fixed pivot 25ᶜ. The use of a third arm 25ᵈ will be more particularly explained below.

An escape wheel 26, which is permanently connected with the toothed wheel 21ᵉ, and an anchor 27 with a balance 28 fixed rigidly to it form the auxiliary retarding device. The anchor swings about a pivot 29. As the means for bringing the auxiliary retarding device into the operative position there are employed a plate 30, which carries the pivot 29 and is fulcrumed to a fixed pivot 31, and a spring 32, which seeks by means of a pin 33 fixed to the plate 30 to displace the latter in such a manner as to cause the anchor to engage with the escape wheel 26, i. e. the auxiliary retarding device to be applied to the main retarding means. As a means for connecting this auxiliary device with the exposure setting device, which latter will be described below, a lever 34 with several arms is employed, which lever is fulcrumed to a fixed pivot 35 and catches by means of the projection 34ᵃ behind the pin 33.

The following device serves for setting the shutter for the duration of exposure: Through a slot 36 (Figs. 4 to 6) of a plate 37, which serves as cover-plate to the shutter, a pin 38 fixed to the third arm 25ᵈ of the lever 25 projects, and through a second slot 39 a pin 40 fixed to an arm 34ᵇ of the lever 34 projects. The cover-plate 37 bears a fixed pivot 41. A cam-disk 42 (rotatable about this pivot), the outer circumference of which disk is formed by two cam-curves 42ᵃ and 42ᵇ and the inner circumference of which has a recess 42ᶜ concentric to the pivot 41, can be set by means of a small actuating wheel 43 (itself rotatable about this pivot and shown in Fig. 7), which wheel is coupled to the said disk by means of a pin 44. The rim of this small actuating wheel bears a time-scale 45ᵃ, to which an index mark 45ᵇ on the cover-plate corresponds. The outer circumference of the disk 42 allows, according as it is set, the pin 38 to approach the disk-center more or less, and so allows the tooth 25ᵇ to enter more or less deeply within the recess 9ᶜ. The recess 42ᶜ is so disposed that the pin 40 is held fast in a notch 41ᵃ of the pivot 41 so long as the path of the pin 38 toward the center of the disk 42 is limited by the curve 42ᵃ (Fig. 4); the lever 34 then holds with its projection 34ᵃ the plate 30 fast by its pin 33 and thereby prevents the spring 32 from applying the auxiliary retarding device. When however the cam-disk is set in such a way that the path of the pin 38 is limited by the curve 42ᵇ (Figs. 5 and 6), the spring 32 can apply the auxiliary retarding device, as in this position the recess 42ᶜ permits the pin 40 to move in the slot 39.

The mode of operation of the shutter is as follows: The setting device having first of all the position shown in Fig. 4, corresponding to the shortest duration of exposure, the pin 38 is held by the highest point of the curve 42ᵃ in its outermost position, so that the tooth 25ᵇ cannot engage at all. After releasing the wound up shutter the spring-drum therefore flies back entirely unchecked into its position as shown in Fig. 1, the link 11 opening the shutter and closing it again immediately. When the disk is rotated in the counter-clockwise direction out of the position shown in Fig. 4, the auxiliary retarding device still remains inoperative, as the pin 40 is still held fast in the notch 41ᵃ, but the curve 42ᵃ now permits the pin 38 to move, such movement being greater, the farther the disk is rotated. The spring 22 therefore causes, when the shutter is being wound up, with the help of the lever-arms 23ᵇ and 25ᵃ the tooth 25ᵇ to enter the recess 9ᶜ, and so much deeper, the farther the pin 38 can approach the center of the disk. If the wound up shutter be now released, the link 11, when the spring-drum flies back, again opens the shutter, and on the further movement of the drum the main retarding means is operated, through the edge 9ᵈ striking the tooth 25ᵇ, and the movement of the spring-drum is thus retarded. During its further retarded running down the spring-drum gradually turns the lever 25 so far, that the tooth 25ᵇ ceases to engage with the edge 9ᵈ, and the main retarding means thus becomes inactive. The spring-drum then flies back into the position as shown in Fig. 1, the link 11 again closing the shutter. The disk 42 having been shifted so far as to bring the inner end of the curve 42ᵃ opposite the pin 38, this position of the parts corresponds to the longest duration of exposure to be attained with the main retarding means alone. If for attaining a still longer duration of exposure the disk be shifted farther, so that the movement of the pin 38 in the slot 36 is no longer limited by the curve 42ᵃ but by the curve 42ᵇ (Fig. 5), the auxiliary retarding device is at the same time applied to the main retarding means, by the pin 40 being released and the spring 32 causing the anchor to engage. In order that, when the shutter is being wound up, tooth 25ᵇ of the lever 25 may be forced to enter the recess 9ᶜ, the lever 23 must be able under the influence of the spring 22 to turn in the clockwise direction. To such a turning corresponds an oppositely directed one of the escape wheel. The motion of this wheel is however retarded by the anchor, as long as the latter is in its operative position. In order to let the tooth 25ᵇ engage, the anchor is therefore, when the shutter is being wound up, put out of its operative position, shortly before the final position is reached, by the pin 17 on the spring-drum acting on the arm 34ᶜ of the lever 34 and so moving the latter that its projection 34ᵃ disengages the anchor. After the shutter is released and during the flying back of the spring-drum the pin 17, however, immediately frees the lever 34 and the spring 32 applies the auxiliary retarding device again. The outer end of the curve 42ᵇ gives the pin 38 less play in the slot 36 than the inner end of the curve 42ᵃ; for on actuating the setting device and passing from the use of the main retarding means alone to the additional use of the auxiliary retarding device, the increase of the duration of exposure would undergo a jump, were there not at the same time the curve 42ᵇ causing, by means of a diminution in the play of the pin 38, the tooth 25ᵇ to enter the recess 9ᶜ less deeply, so that also in this case the duration of exposure increases uniformly. On the disk 42 being rotated farther, the play of the pin 38 goes on increasing, and at the same time the duration of exposure, which latter reaches its greatest value, when the pin has reached the end of the curve 42ᵇ (Fig. 6).

We claim:

In an objective shutter a set of blades, an actuating mechanism therefor, a device for setting the shutter for different durations of exposure, a main retarding means controlling the actuating mechanism and in turn controlled by the setting device, this means consisting of a train of wheels, the last of which wheels is an escape wheel, an anchor adapted to coact with the escape wheel and means for causing the engagement and disengagement of the anchor and the escape wheel, this latter means being controlled by the setting device.

CHRISTIAN BRUNS.
HEINRICH BRUNS.

Witnesses:
WALTER GRESITEN,
RICHARD NELS.